United States Patent [19]
Miller et al.

[11] Patent Number: 5,140,534
[45] Date of Patent: Aug. 18, 1992

[54] CENTERLESS RUNOUT AND PROFILE INSPECTION SYSTEM AND METHOD

[75] Inventors: Thomas W. Miller, Butler; Hans E. Leumann, Washington; Bruce K. Salmond, Upper St. Clair; Larry J. Appolonia, Carroll Township, Washington County, all of Pa.

[73] Assignee: Westinghouse Electric Corp., Pittsburgh, Pa.

[21] Appl. No.: 555,346

[22] Filed: Jul. 20, 1990

[51] Int. Cl.$^5$ .............................................. G01B 21/20
[52] U.S. Cl. .................................. 364/560; 356/376; 364/506; 33/203.15
[58] Field of Search .............. 364/550, 560, 561, 562, 364/563, 559, 505, 506, 507, 508, 551.01; 33/203.15, 203.16, 551; 356/375, 376, 386

[56] References Cited

U.S. PATENT DOCUMENTS

| | | | |
|---|---|---|---|
| 4,775,947 | 10/1988 | Marron | 364/550 |
| 4,875,776 | 10/1989 | Pryor | 356/375 |
| 4,941,105 | 7/1990 | Marangoni | 364/506 |
| 5,005,978 | 4/1991 | Skunes et al. | 356/385 |

FOREIGN PATENT DOCUMENTS

0081417 7/1981 Japan ................................... 356/376

*Primary Examiner*—Parshotam S. Lall
*Assistant Examiner*—Michael Zanelli
*Attorney, Agent, or Firm*—A. C. Addessi

[57] ABSTRACT

The runout or profile of parts is measured without the need for precision supports by rotating the part generally about an axis of rotation. The changes in position of one or more reference surfaces on the part along first and second tracking axes are measured for a plurality of rotational positions of the part. The change in position of the target surface for which the runout or profile is to be determined is measured along a third tracking axis which lies substantially in a common plane with the first and second tracking axes. The change in position of the rotational axis of the part along the third tracking axis is determined from the changes in position of the one or more reference surfaces and the distances between the tracking axes, and is subtracted from the measured change in position of the target surface along the third tracking axis to determine the runout or profile. Independent measurement devices, which can be aligned to the vertical using a level when the tracking axes are horizontal comprise a transmitter generating a plane of laser energy extending along and perpendicular to the tracking axis and a receiver which detects the change in the portion of the plane of laser energy blocked by the surface being tracked.

23 Claims, 10 Drawing Sheets

CENTERLESS RUNOUT AND PROFILE INSPECTION SYSTEM AND METHOD

BACKGROUND OF INVENTION

1. Field of Invention

This invention relates to a method and system for measuring the runout and profiles of parts without the need for precision supports.

2. Background Information

Current methods of inspecting and measuring the runout of shafts and rotors or the profiles of cams, cranks, screws and other such similar parts require the use of precision supports for rotation of either the inspection part or the measurement gauge to establish the parts center or a reference surface. Examples of these supports include V-blocks, precision centers, granite inspection tables, instrument spindles, lathes, rotary tables or other such precision devices. Setup and use of these devices requires the labor of one or more highly trained and skilled technicians. The inspection operation can be very time consuming, labor intensive, expensive and tedious to perform. In some cases large objects, such as generator rotors and turbine assemblies, can make current methods of inspection impractical.

There is a need therefore for an improved method and system for measuring runout or the profile of parts which eliminates the requirement for precision support of the measuring instrument or the part to be inspected.

There is a related need for such a method and system which does not require a highly trained and skilled technician.

There is a further need for such a method and system which reduces setup and inspection time.

SUMMARY OF THE INVENTION

These and other needs are satisfied by the invention which is directed to apparatus and a method of detecting and measuring the runout or profile of surfaces on a part which does not require precision supports. The part is rotated generally about a selected axis of rotation. It is not necessary that the part be rotated precisely about this axis. As the part is rotated, one or more reference surfaces are tracked along first and second tracking axes. The profiles of these reference surfaces are presumed to be precise. The surface which is to be checked for runout or profile is tracked along a third tracking axis as the part is rotated. All three tracking axes lie substantially in a common plane and are all generally transverse to the axis of rotation of the part. Changes in position of the one or more reference surfaces and the target surface are measured along the respective tracking axes for a plurality of angular positions of the part. The distances between the tracking axes are also measured. The runout or profile of the target surface is then determined as a function of the change in position of the one or more reference surfaces along the first and second tracking axes, the change in position of the target surface along the third tracking axis and the distances between the tracking axes.

In determining the runout or profile for each rotational position of the part, the change in position of the axis of rotation along the third tracking axis is determined as a function of the changes in position of the one or more reference surfaces along the first and second tracking axes, and then the runout or profile is determined from the difference between the measured change in position of the target surface along the third tracking axis and this calculated change in position of the axis of rotation along the third tracking axis.

In accordance with another aspect of the invention, the changes in position of the surfaces tracked along the respective tracking axes are measured by transmitting radiant energy toward the tracked surface and detecting interception of the radiant energy thereby. More particularly, a plane of radiant energy is transmitted along the tracking axis in a plane perpendicular to the common plane in which all of the tracking axes lie over the range of movement of the tracked surface. A portion of this plane of radiant energy is blocked by the part at the tracked surface. By detecting the change in the portion of the plane of radiant energy blocked by the tracked surface as the part is rotated, the change of position of the tracked surface is measured. Alternatively, other systems can be used for measuring the changes in position of the tracked surfaces, such as for instance, linear variable differential transformers (LVDTs) having a blade attached to the core of the LVDT and biased against the surface to be tracked.

The invention has particular application to determining the runout of the many surfaces on an electrical generator rotor. By selecting horizontal tracking axes for the reference surfaces and target surfaces on the rotor, the measuring devices are mounted on separate stands which may be individually aligned with the plane of radiant energy, preferably laser energy, oriented in the vertical using known commonly available leveling equipment. The measuring device for the third tracking axis may be moved along the rotor to measure the runout at any desired point along the rotor. The rotor is supported, for both assembly and measuring the runout on power rollers, since it is not required that the rotor be rotated precisely about its longitudinal axis for measuring runout. The invention is also useful for checking the profile of noncylindrical parts such as cam shafts and other irregular shapes. In addition, the invention can be used to determine concentricity.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figures 1, 6:
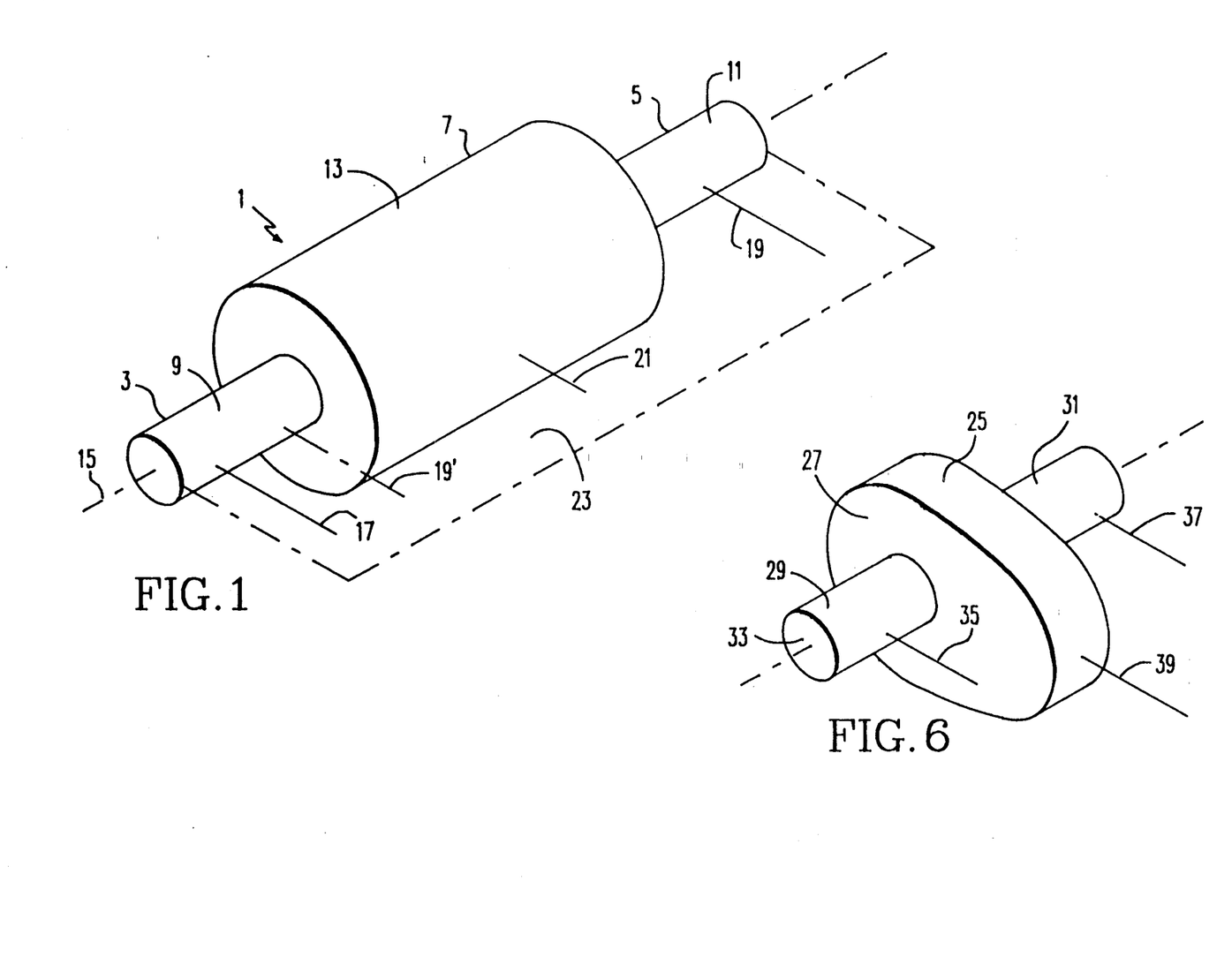
FIG. 1 is an isometric view of the application of the invention to determining the runout or profile a roller.
FIG. 6 is a isometric diagram illustrating application of the invention to measuring the profile of a cam.

Referring to FIG. 1, the invention will be described as applied to determining the runout or profile of a roller 1 having a first cylindrical end section 3, a second cylindrical end section 5 and a cylindrical center section 7. The end sections 3 and 5 define cylindrical reference surfaces 9 and 11, respectively, while the center section defines a target surface 13 which is to be inspected for runout or profile. As will become evident as the discussion progresses, the particular configuration of the roller 1 is not critical. What is needed is at least one reference surface and one target surface to be inspected. In the roller 1 these surfaces are cylindrical although they need not be. However, the configuration of the reference surfaces must be known and are considered to be precise. For instance, the surfaces 9 and 11 of the roller 1 are considered to be precisely cylindrical.

In accordance with the invention, the roller 1 is rotated generally about its longitudinally axis 15. It is an advantage of the invention that the roller 1 need not be rotated precisely about the axis 15. While the roller 1 is rotated, the reference surfaces 9 and 11 are tracked along spaced apart first and second tracking axes 17 and 19, respectively, and the target surface 13 is tracked along third tracking axis 21. All three tracking axes 17, 19 and 21 lie in a common plane 23 and are preferably generally perpendicular to the longitudinal axis 15 of the roller 1. Accuracy of measurements made along the tracking axes are not greatly affected if the tracking axes are not precisely parallel to each other in the common plane 23. Greater inaccuracies can be introduced if any of the surfaces do not lie in the common plane 23.

Figure 3:
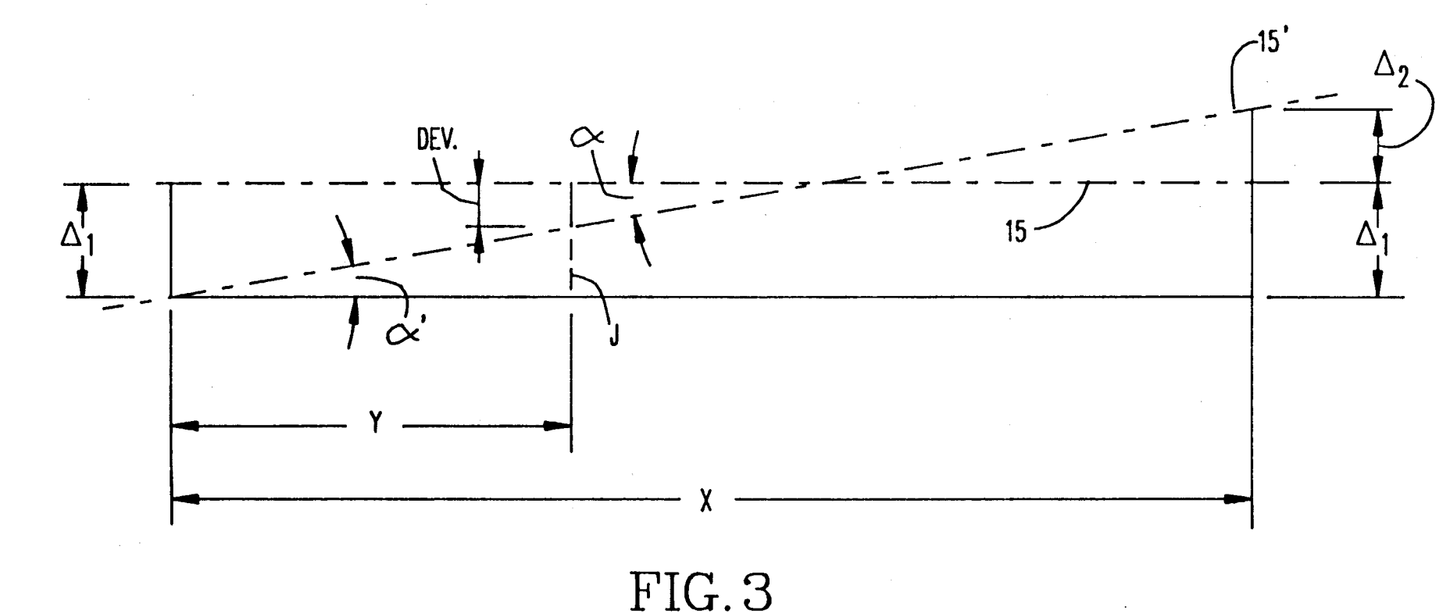
FIG. 3 is a diagram illustrating graphically the determination of the deviation of the longitudinal axis of the roller of FIG. 2 along the tracking axis tracking the surface for which the runout or profile is to be measured.
Figure 4:
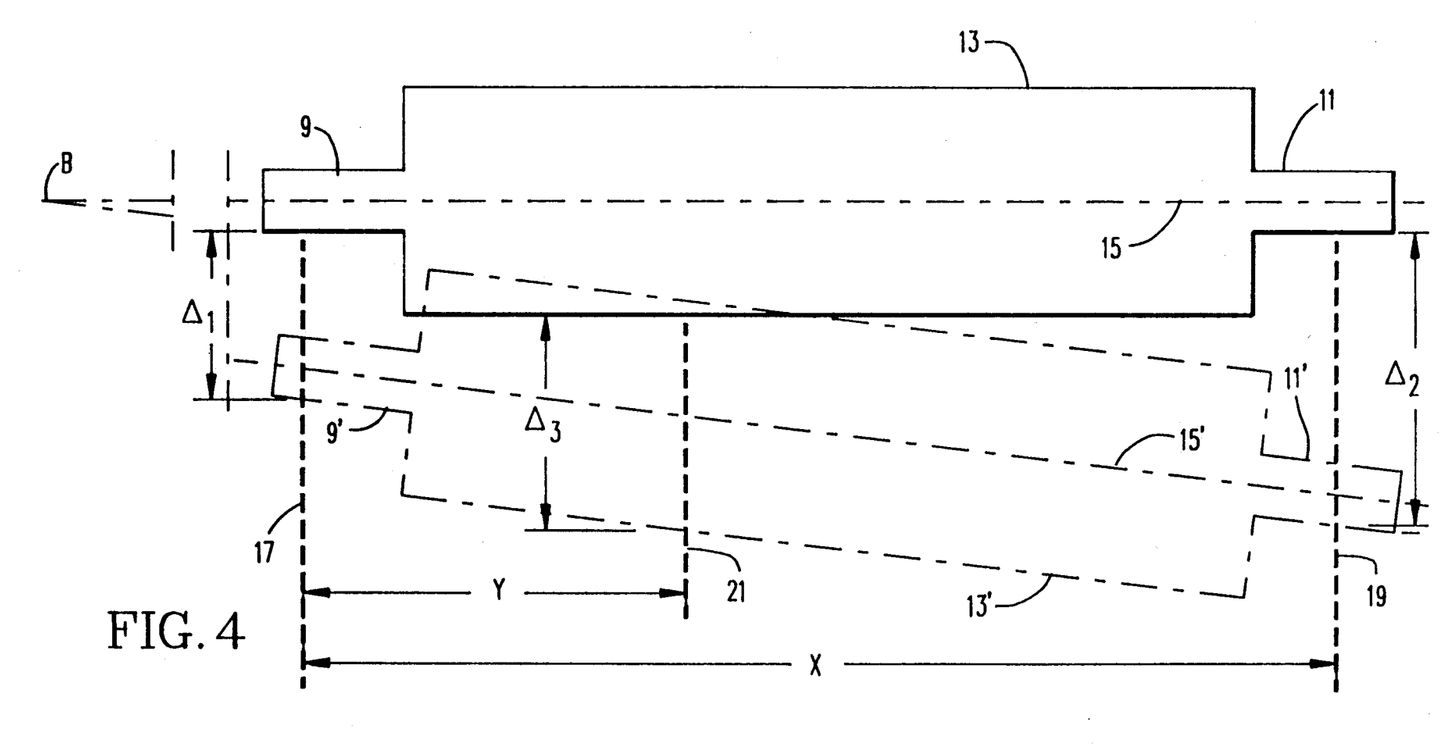
FIG. 4 is a diagram similar to that of FIG. 2 wherein the rotational axis of the roller rotates about a point outside of the roller.

As the roller 1 is rotated, measurements are made along the tracking axes 17, 19 and 21 of the movement of the reference surfaces and the target surface. If the roller is not rotated precisely about its longitudinal axis 15, it will wobble as exaggerated in FIGS. 2 and 4. In these figures, the position of the roller 1 at the first angular position is shown in full line and at a second angular position in phantom. Corresponding parts are shown in the second position with primed reference characters. In the case shown in FIG. 2, the roller 1 wobbles as it is rotated so that its longitudinal axis 15 precesses about a point A which is intermediate the ends of the roller. On the other hand, FIG. 4 illustrates the case where the projected axis 15 of the roller precesses about a point B which is beyond one end of the roller. In both cases it can be seen, however, that since the roller 1 does not rotate precisely about this longitudinal axis, the reference surface 9 moves by the amount $\Delta_1$, as measured along the first tracking axis 17, the second reference surface 11 moves by an amount $\Delta_2$ along the second tracking axis 19 and the target surface 13 movement is $\Delta_3$ measured along the third tracking axis 21. As can be seen graphically in FIG. 3, by measuring the distance, X, between the first and second tracking axes 17 and 19, the tangent of the angle α of the longitudinal axis 15 between the two angular positions of the roller 1 for the case shown in FIG. 2 is determined by the formula:

$$\tan \alpha = \frac{\Delta_2 - \Delta_1}{X} \qquad \text{Eq. (1)}$$

Figure 2:
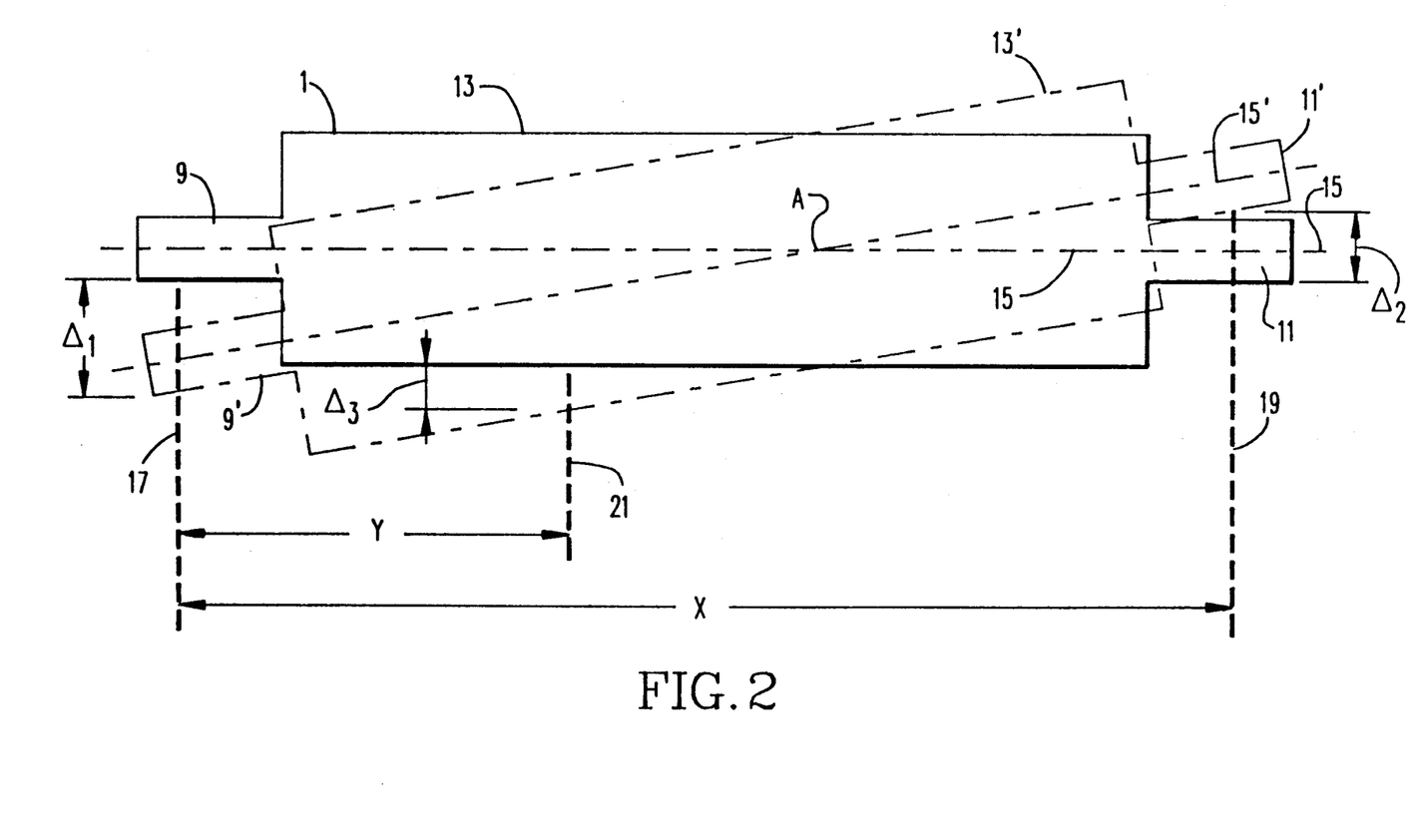
FIG. 2 is a sketch illustrating operation of the invention and determining the runout or profile of the roller of FIG. 1 where the longitudinal axis of the roller rotates about a point within the roller.

(in the example of FIG. 2, $\Delta_1$ is considered negative since it extends downward from the original position of the axis 15). The tangent of α is also determined by the following formula:

$$\tan \alpha = \frac{J}{Y} \qquad \text{Eq. (2)}$$

where Y is the distance between the tracking axes 17 and 21 and J is the side opposite the angle α'.

Substituting and rearranging:

$$J = Y \frac{[\Delta_2 - \Delta_1]}{X} \qquad \text{Eq. (3)}$$

The change in position, dev, of the axis 15 along the tracking axis 21 is then:

$$dev = \Delta_1 + J \qquad \text{Eq. (4)}$$

(again $\Delta_1$ is considered negative in the example of FIG. 2 as is dev while J is positive). Substituting equation 3 in equation 4:

$$dev = \Delta_1 + Y \frac{[\Delta_2 - \Delta_1]}{X} \qquad \text{Eq. (5)}$$

The runout or profile, ε, is then the difference between the change in position of the tracking axis along the third tracking axis 21 and the measured change in position of the target surface 13 along the axes 21, or:

$$\epsilon = \Delta_3 - dev \qquad \text{Eq. (6)}$$

Figure 5:
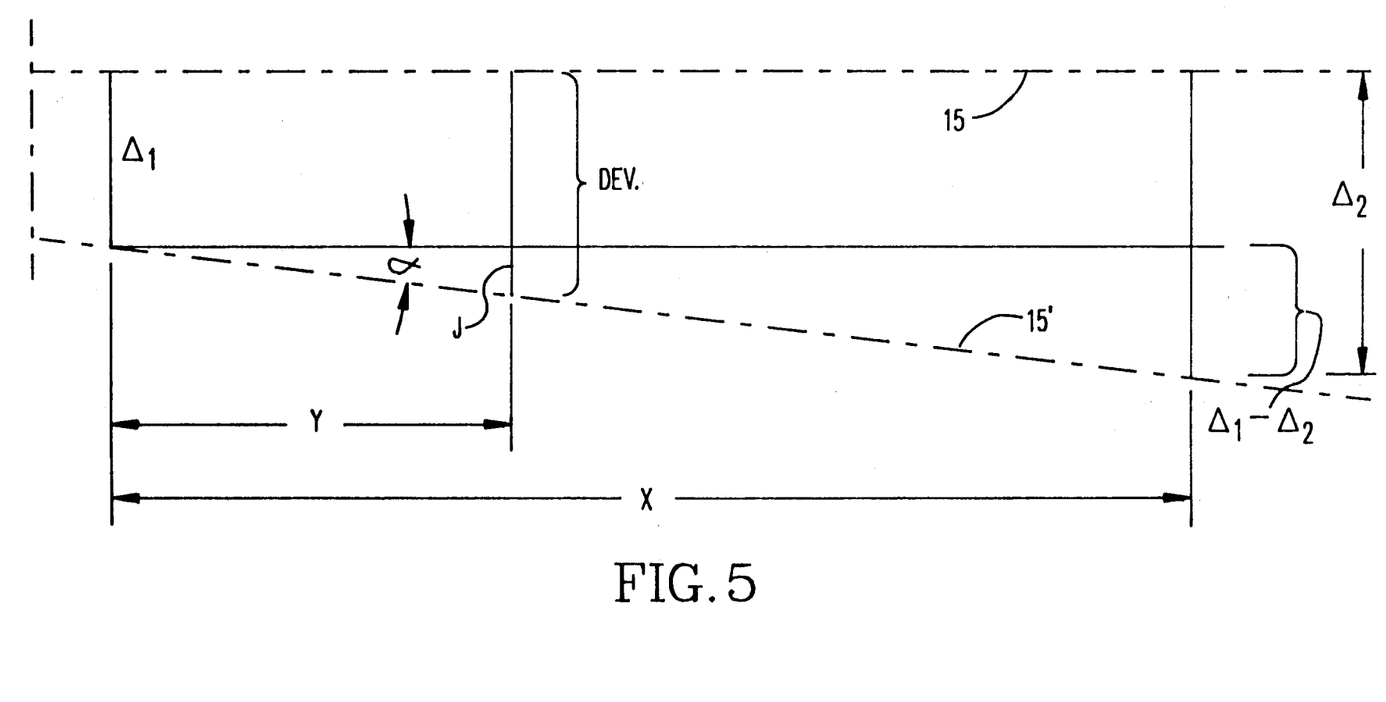
FIG. 5 is a sketch similar to that of FIG. 3, but showing graphically the calculation of the deviation of the longitudinal axis of the roller for the conditions shown in FIG. 4.

Similarly as shown graphically in FIG. 5, equations 5 and 6 can be used to determine the change in position of the axis of rotation and the runout or profile where the axis of rotation rotates about a point outside of the part. In the above equations, the tracking axis 17 is considered to be the origin so that, if the tracking axis 21 tracking the target surface is to the left of the axis 17 as viewed in FIGS. 2 and 4, the sign of the distance, Y, between the axes 17 and 21 is negative.

Similar measurements and calculations are made for a plurality of angular positions of the roller 1 through 360 degrees of rotation. The maximum difference between the change in position of the axis of rotation and measured movement of the target surface along the third tracking axis is the run out of the target surface. If desired, these deviations can be plotted to generate a visual representation of the runout.

It should be noted that the technique for measuring the runout does not require the measurement of the diameter of any of the cylindrical sections of the rotor. In addition, the various sections may be of different diameters. It is also not necessary to have two distinct reference surfaces if the first and second tracking axes can be spaced far enough apart on a single reference surface as shown in FIG. 1 where the axial length of the reference surface 9 is sufficient that the second tracking axis 19' can also be used to track the reference surface 9. The greater the distance between the first and second tracking axes, the greater is the accuracy of the calculations made by equations 1 and 2.

The technique of the invention can also be applied for checking the profile of noncylindrical surfaces such as the camming surface 25 on the cam 27 shown in FIG. 6. Here, the changes in position of reference surfaces 29 and 31 on opposite ends of shaft 33 on which cam 27 is mounted for rotation are measured along first and second tracking axes 35 and 37, respectively, while movement of the camming surface 25 is measured along the third tracking axis 39. The calculation using equation (5) establishes movement of the axis of rotation at the third tracking axis 39. The differences between the movement of the axis of rotation at each angular position of the rotor 1 and the measured movement of he camming surface 25 along the third tracking axis 39 calculated using equation (6) represent the actual profile of the cam surface. This actual profile can be compared with the design profile to determine any errors in the profile.

Figure 7A:
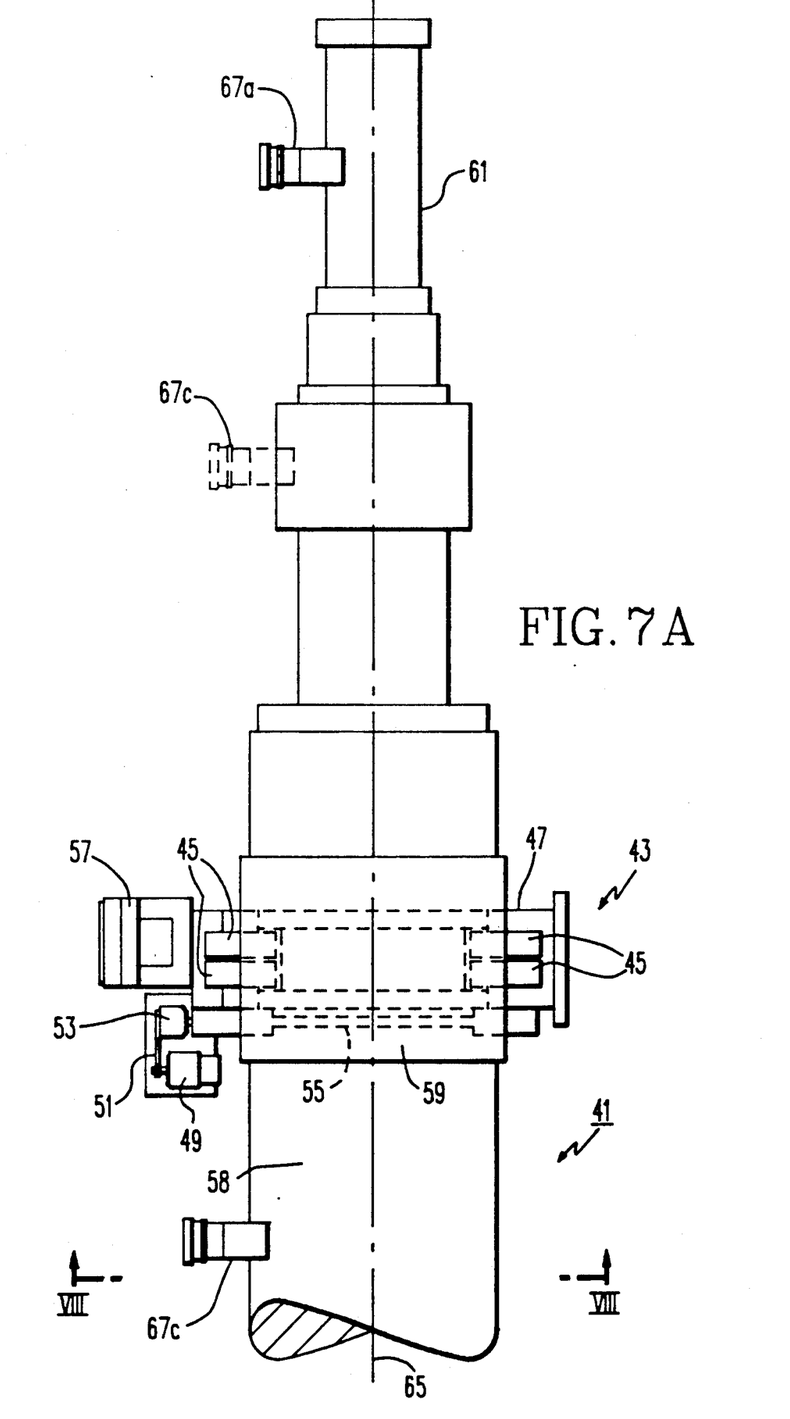
FIGS. 7A and 7B when placed end to end illustrate a plan view of the invention applied to measuring the runout on the rotor of an electric generator.
Figure 7B:
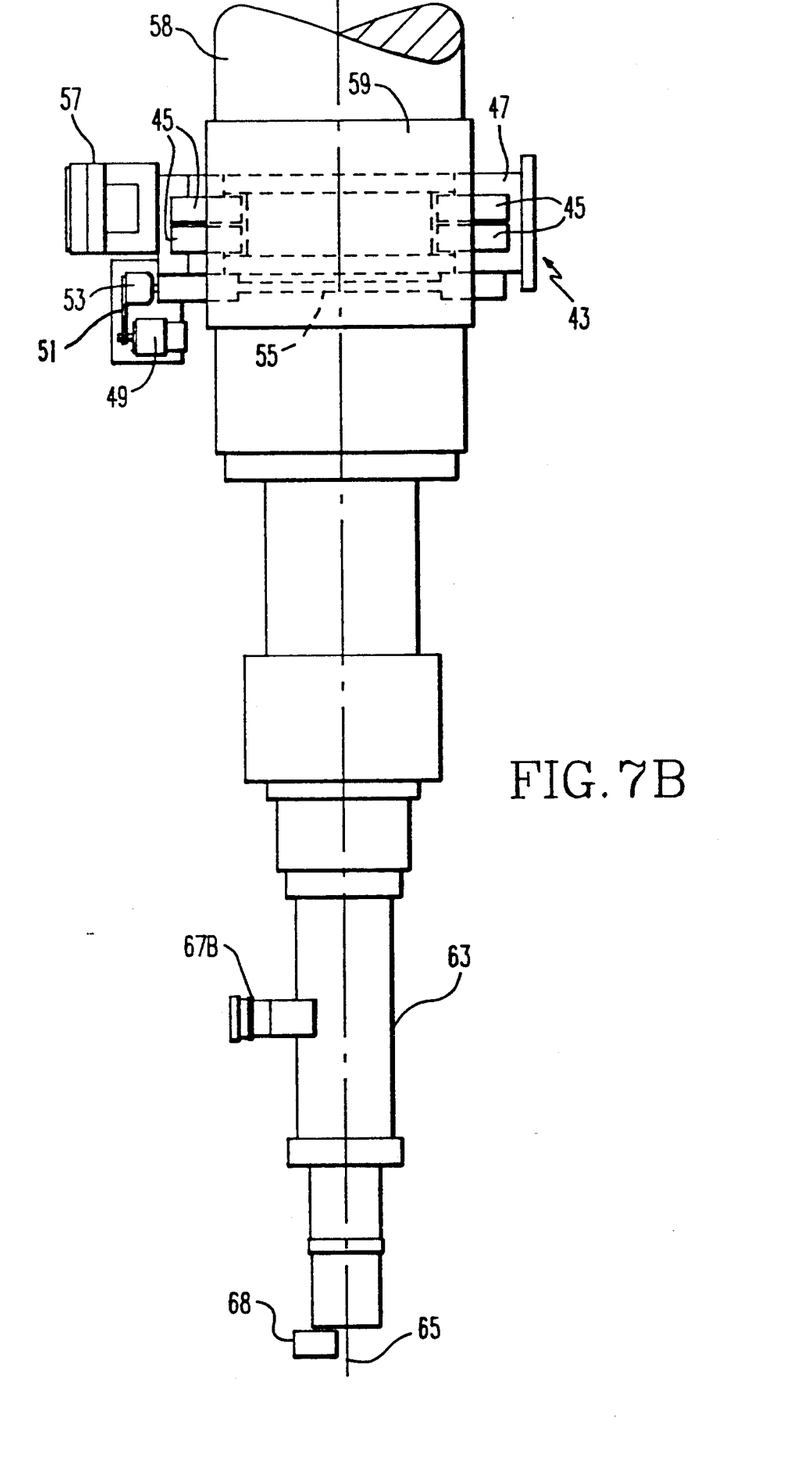

An example of an application of the invention is the use of the technique for determining the runout of the various surfaces of the rotor of a large electric power generator. Such a rotor 41 as shown in FIGS. 7A and 7B can typically be 35 to 40 feet long. The rotor is machined from a forging and has a number of elements such as blower hubs contact rings, etc., shrink fit onto the machined forging. The runout of the machined surfaces and accessories added to the rotor are checked during initial manufacture and assembly, and also during overhaul. The practice has been to mount an accessory on the rotor in an assembly area, and then transport the entire rotor to a precision lathe for checking and correcting runout. The rotor is then returned to the assembly area for mounting of the next accessory. This procedure is very time consuming and therefore costly.

In accordance with the invention, the rotor 41 is supported for both assembly and checking of runout on a pair of spaced-apart power rollers 43. Each of the power rollers 43 comprise pairs of rollers 45 laterally spaced apart on a frame 47. The rollers 45 are driven by an electric motor 49 through a chain 51, gear boxes 53 and shaft 55. Power for the roller motor is provided through power supply 57.

The rotor 41 is supported by the spaced-apart pairs of rollers 45 and the roller supports 43. As the large center section of the rotor 58 is slotted longitudinally for receiving the rotor windings, bellybands 59 are used to provide a smooth rotational surface for rotating the rotor.

Bearing surfaces 61 and 63 adjacent the ends of the rotor 41 are used as the reference surfaces for measuring runout in accordance with the invention. Changes in position of the reference surfaces 61 and 63 due to the fact that the rotor is not precisely rotated about longitudinal axis 65 by the power rollers 43 are measured by laser gauges 67a and 67b. The change in position of a selected target surface on the rotor 41 as the rotor rotates is measured by a mobile laser gauge 67c. As shown in phantom in FIG. 7A, this laser gauge 67c can be moved to successively measure the runout of each of the various surfaces of the rotor 41. A rotary encoder 68 tracks the angular position of the rotor 41.

Figure 8:
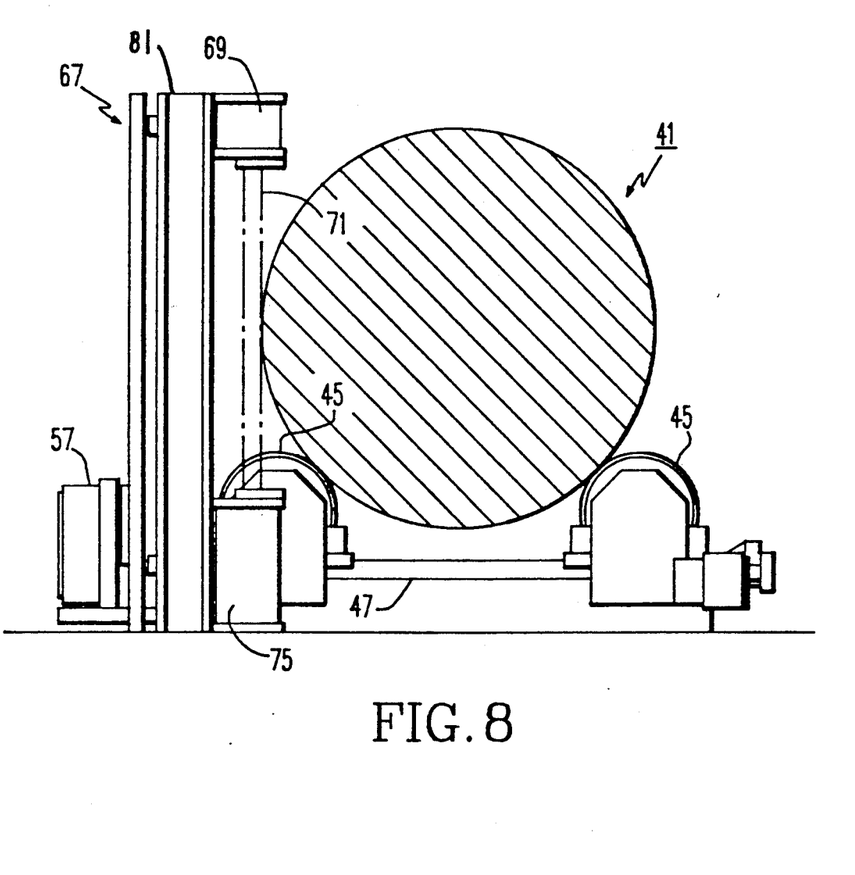
FIG. 8 is a vertical section through FIGS. 7A and 7B.
Figure 9:
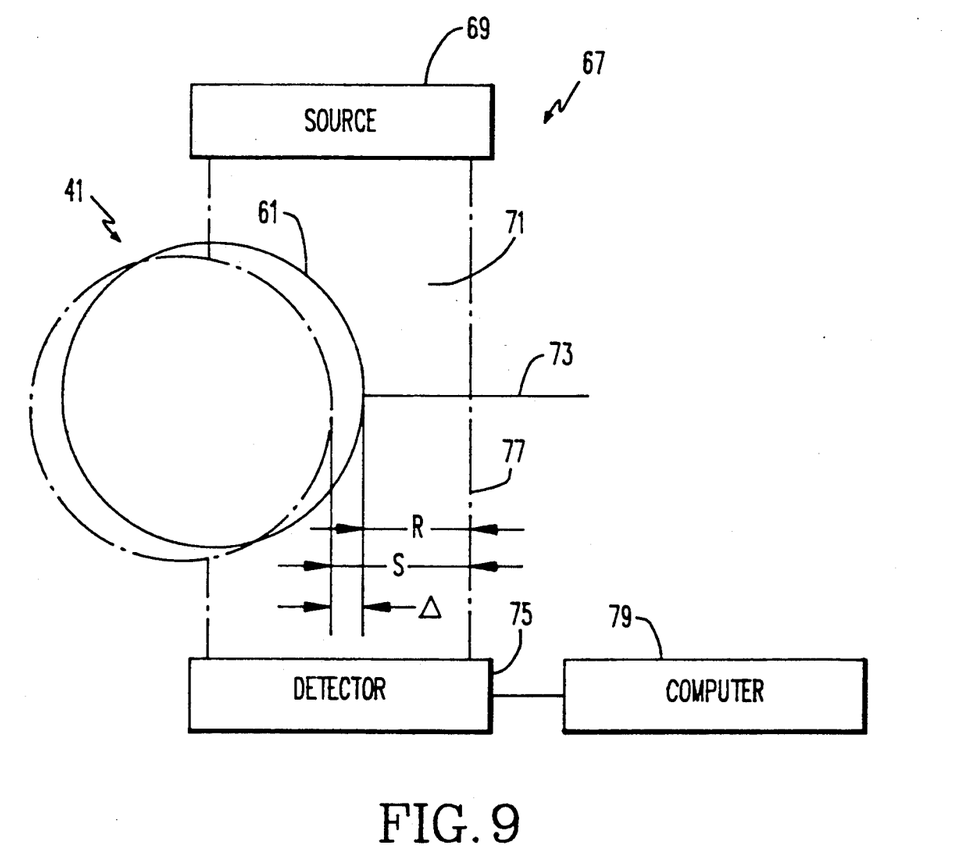
FIG. 9 is a schematic view illustrating the technique used to measure movement of the surfaces of the generator rotor in accordance with the invention.

As illustrated in FIG. 8 and in more detail in FIG. 9, the laser gauges 67 comprise a laser source 69 which projects a plane of radiant energy 71 perpendicular to the tracking axis 73 for the surface such as 61 being tracked. This plane of radiant energy 71 is also perpendicular to the common plane containing the tracking axes of the other laser gauges which in turn is perpendicular to the plane of FIG. 9. The laser gauge 67 is positioned so that the surface 61 of the rotor 41 intersects and partially blocks the plane radiant energy generated by the source 69 for all rotational positions of the rotor 41. Radiant energy from the source 69 is detected by the detector 75. The detector 75 measures the position of the surface 61 along the tracking axes 73 by determining the portion edge 77 of the plane of radiant energy that is not blocked by the surface 61 measured from the edge 77. Thus, for the position of the surface 61 shown in full line in FIG. 9 radiant energy of a width R is sensed by the detector 75. As the rotor 41 rotates and the surface 61 moves to the position shown in phantom in FIG. 9, the detector measures radiant energy of a width S. The difference between the measured widths R and S is the amount that the surface 61 has moved along the tracking axes 73 as the rotor 41 is rotated between the two positions shown in FIG. 9. Suitable laser gauges 67 are available from the Laser-Mike Company.

In accordance with the invention, there is no need to precisely mount the rotor for rotation or to precisely position the laser gauges 67 relative to one another. The only alignment required is that the tracking axes 73 for all of the laser gauges 67 lie in a common plane and are substantially parallel to one another. For measuring the runout of the horizontally supported generator rotor, this alignment can be easily made by mounting the laser gauges 67 on stands 81 which are leveled with respect to the earth. This alignment can easily be accomplished with conventional leveling devices.

While it is possible for an operator to read out the measurements R and S from the laser gauge 67 to calculate the Δ for each change in position of the rotor 41, it is preferable to have these calculations performed by a computer 79 which can correlate the measurements with the angular position of the rotor which is tracked by the rotary encoder 68.

Figure 10:
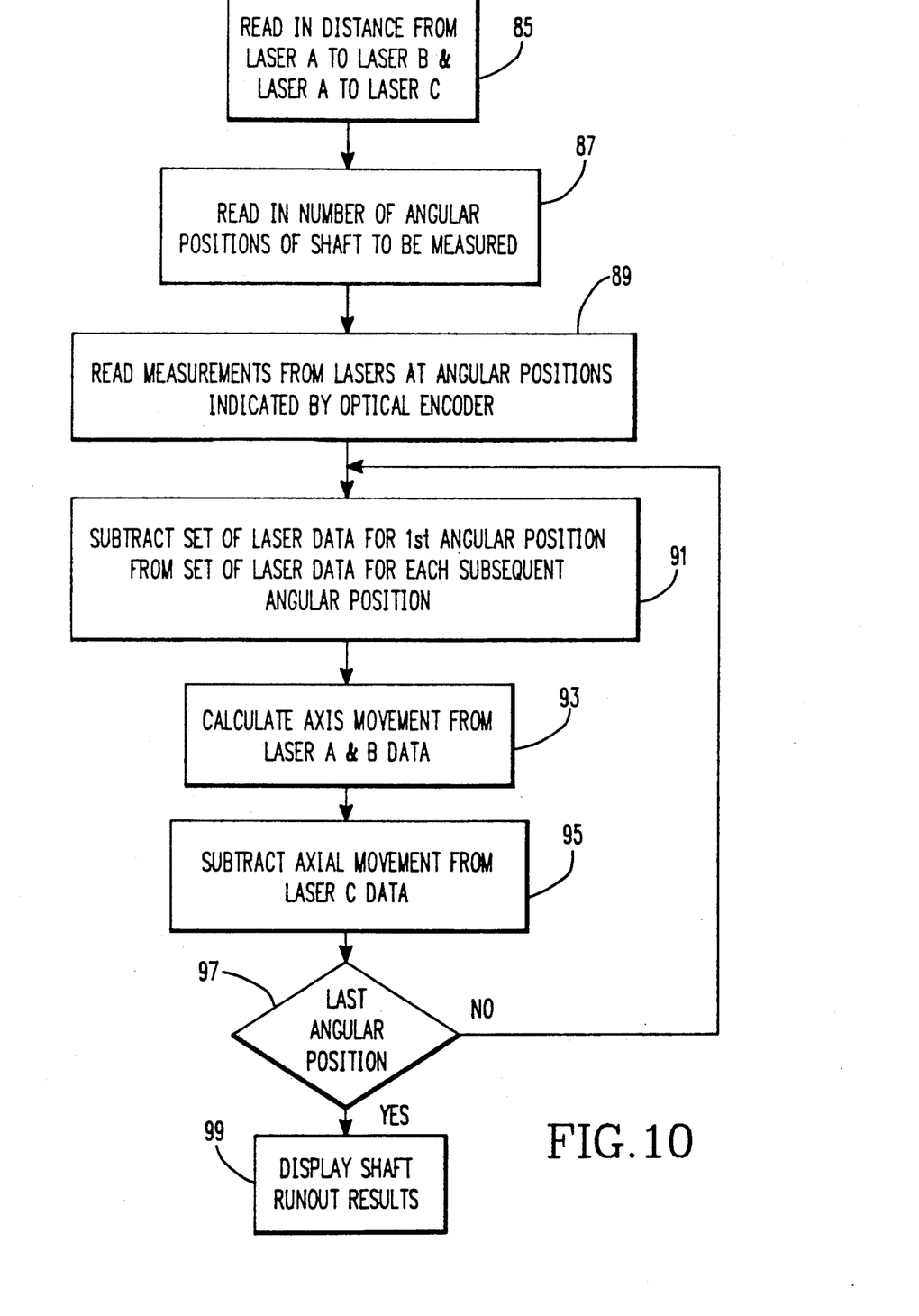
FIG. 10 is a flow chart for a suitable computer program which forms a part of the invention.

A flow chart for a suitable computer program for the computer 79 is shown in FIG. 10. Initially, the operator inputs to the computer the distances between the lasers and the number of angular positions of the shaft to be measured as indicated at 85 and 87 respectively. As the rotor is rotated by the power rollers 43, measurements taken by the laser gauges 67 at each of the angular positions determined by the optical encoder 68 are read into the computer as indicated at 89. For each set of laser measurements taken at each angular position, the set of laser data for the first angular position is subtracted from the set of data for each subsequent angular position to generate the Δ(s) as indicated in 91. The movement of the rotational axis at the laser C is then calculated at 93 from the laser data for the A and B lasers. This movement of the rotational axis is then subtracted from the Δ calculated for laser C to determine the runout/profile on the target surface as indicated at 95. These calculations are repeated for each angular position of the rotor, as indicated at 97. The runout results are then displayed at 99.

Other types of gauges for measuring reference and target surface movement could be utilized. For instance, linear variable differential transformers (LVDTs) could be utilized with blades attached to their movable cores biased against the surfaces to be tracked.

As has been demonstrated, the invention provides accurate measurement of runout and the profile of part surfaces without the need for precision mounts for the part or the measurement gauges to establish parts centers or a reference surface. The invention is suitable for inspecting and measuring the runout of shafts and rotors or the profiles of cams, cranks, screws and other similar parts.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of detecting and measuring the runout or profile of a target surface on a part having at least one reference surface, said method comprising the steps of:
   rotating said part generally about a selected axis of rotation;
   tracking said at least one reference surface along first and second tracking axes spaced apart generally along said selected axis of rotation as said part is rotated;
   tracking said target surface along a third tracking axis as said part is rotated, said first, second and third tracking axes lying substantially in a common plane and all being generally transverse to said selected axis of rotation;
   measuring the distances between said tracking axes;
   measuring the change in position of the at least one reference surface along each of the first and second tracking axes and the change in position of the target surface along said third tracking axis between first and second rotational positions of said part; and
   determining the runout or profile of the target surface as a function of said change in position of the at least one reference surface along the first and second tracking axes, the change in position of the target surface along the third tracking axis, and the distances between the tracking axes;
   wherein determining the runout or profile includes,
   determining as a function of the changes in position of the at least one reference surface along said first and second tracking axes, the change in position of said selected axis of rotation along said third tracking axis; and
   determining the runout or profile from the difference between the measured change in position of the target surface and the change in position of the selected axis of rotation along said third tracking axis.

2. The method of claim 1 including:
   measuring the change in position of the at least one reference surface along said first and second tracking axes and the change in position of the target surface along the third tracking axis between the first rotational position of the part and each of a plurality of rotational positions of the part about said selected axis of rotation; and
   determining the runout or profile for each rotational position of said part about said selected axis of rotation.

3. The method of claim 2 wherein said part has first and second reference surfaces and said tracking includes tracking said first reference surface along said first tracking axis and tracking said second reference surface along said second reference axis and wherein said measuring includes measuring the change in position of said first reference surface along said first tracking axis and measuring the change in position of the second reference surface along said second tracking axis.

4. The method of claim 3 wherein said first reference surface is cylindrical and of a first diameter and the second reference surface is cylindrical and of a second diameter independent of said first diameter, and wherein said runout or profile is determined in accordance with the following relationship:

$$\epsilon = \Delta_3 - \Delta_1 - Y\frac{[\Delta_2 - \Delta_1]}{X}$$

where $\epsilon$ equals the runout or profile of the target surface along the third tracking axis, $\Delta_1$ equals the change in position of the first reference surface measured along the first tracking axis, $\Delta_2$ equals the change in position of the second reference surface measured along the second tracking axis, $\Delta_3$ equals the change in position of the target surface measured along the third tracking axis, X equals the measured distance between the first and second tracking axes and Y equals the measured distance between the first and third tracking axes.

5. The method of claim 1 wherein said at least one reference surface is cylindrical and the changes in position of said selected axis of rotation along said first and second tracking axes are directly equal to said measured changes in position of said at least one reference surface along said first and second tracking axes.

6. The method of claim 1 wherein said step of measuring the changes in position of the surfaces tracked along said tracking axes comprises for each tracking axis, generating along said tracking axis a plane of radiant energy perpendicular to said common plane in which said tracking axes lie over the range of movement of the tracked surface, a portion of said plane of radiant energy being blocked by said part at said tracked surface, and detecting a change in the portion of said plane of radiant energy blocked by said tracked surface as said part is rotated to said plurality of rotational positions.

7. The method of claim 6 wherein said common plane in which said first, second and third tracking axes lie is horizontal and including aligning each plane of radiant energy to the vertical.

8. Apparatus for detecting and measuring the runout or profile of a target surface on a part having at least one reference surface said apparatus comprising:
   means supporting and rotating said part generally about a selected axis of rotation through a plurality of angular positions;
   means tracking said at least one reference surface and measuring movement of said at least one reference surface along a first tracking axis for each of said plurality of angular positions of said part about said selected axis of rotation;
   second measuring means tracking said at least one reference surface and measuring movement of said at least one reference surface along a second tracking axis spaced from said first tracking axis for each of said plurality of angular positions of said part about said selected axis of rotation;

third measuring means tracking said target surface and measuring movement of said target surface along a third tracking axis for each of said plurality of angular positions of said part about said selected axes of rotation, said first, second and third tracking axes lying substantially in a common plane and generally parallel to one another; and means determining the runout or profile of said target surface at said third tracking axis as a function of the measured movement of said at least one reference surface along said first and second tracking axes and the movement of said target surface along the third tracking axis and the distances between said tracking axes;

wherein said means determining the runout or profile includes, means determining as a function of the movement of the at least one reference surface along said first and second tracking axes, the change in position of said selected axis of rotation along said third tracking axis; and means determining the runout or profile from the difference between the measured movement of the target surface and the change in position of the selected axis of rotation along said third tracking axis.

9. The apparatus of claim 8 wherein said at least one reference surface is cylindrical and has a longitudinal central axis, wherein said selected axis of rotation is said longitudinal central axis of said cylindrical reference surface and wherein said means determining said runout or profile determines the same in accordance with the following relationship:

$$\epsilon = \Delta_3 - \Delta_1 - Y\frac{[\Delta_2 - \Delta_1]}{X}$$

where $\epsilon$ equals the runout or profile of the target surface along the third tracking axis, $\Delta_1$ equals the measured movement of the first reference surface measured along the first tracking axis, $\Delta_2$ equals the change in position of the second reference surface measured along the second tracking axis, $\Delta_3$ equals the measured movement of the target surface measured along the third tracking axis, X equals the measured distance between the first and second tracking axes and Y equals the measured distance between the first and third tracking axes.

10. The apparatus of claim 8 wherein said first, second and third measuring means each comprise:

a radiant energy transmitter transmitting radiant energy which is intercepted by the tracked surface along the tracking axis and a radiant energy receiver which detects interception of said radiant energy by the tracked surface to generate a measure of movement of the tracked surface along the tracking axis.

11. The apparatus of claim 10 wherein said radiant energy transmitter generates a plane of radiant energy perpendicular to the common plane along the respective tracking axes over the range of movement of the tracked surface such that said part blocks a portion of the plane of radiant energy, said radiant energy receiver detecting a change in the portion of the plane of radiant energy blocked by said part to provide said measurement of movement of the tracked surface along the tracking axis.

12. The apparatus of claim 8 wherein said selected axis of rotation generally about which said part is rotated is a longitudinal axis of the part and wherein said means supporting said part include a pair of supports spaced apart along said longitudinal axis of said part and each comprising a pair of roller members mounted for rotation on a frame about axes generally parallel to the longitudinal axis of the part and spaced laterally apart, said part resting on said roller members.

13. Apparatus for measuring the runout of a generator rotor, said rotor having a first cylindrical reference surface near one end, a second cylindrical reference surface near the other end, and a series of intermediate rotor sections to be checked for runout, said apparatus comprising:

means supporting said generator rotor for rotation generally about a longitudinal axis;

first tracking means tracking said first reference surface and measuring the change in position of said first tracking surface along a first tracking axis for each of a plurality of angular positions of said rotor as it is rotated generally about said longitudinal axis;

second tracking means tracking said second reference surface and measuring the change in position of said second reference surface along a second tracking axis for each of said plurality of angular positions of said rotor;

third tracking means moveable along said rotor to successively track selected intermediate rotor sections and measure the change in position of the selected intermediate rotor section along a third tracking axis for each angular position of said rotor, said first, second and third tracking axes all lying in a common plane; and means determining for each angular position of the generator rotor from the changed position of the first and second reference surfaces along the first and second tracking axes respectively, the distance between the first and second tracking axes and the distance between the first and third tracking axes, the change in position of said longitudinal axis along said third tracking axis for each angular position of said rotor, and determining for each said angular position of the rotor the difference between the change in position of the longitudinal axis and the change in position of the selected intermediate surface measured along the third tracking axis.

14. The apparatus of claim 13 wherein each of said tracking means comprises, a radiant energy transmitter generating a plane of radiant energy, a radiant energy receiver, and mounting means mounting said radiant energy transmitter to transmit said plane of radiant energy perpendicular to said common plane along the respective tracking axis over the range of movement of the surface tracked such that the rotor blocks a position of the plane of radiant energy, and mounting the receiver to detect a change in the portion of the plane of radiant energy blocked by said rotor to provide a measurement of the change in position of the tracked surface along the respective tracking axis.

15. The apparatus of claim 14 wherein said common plane of said first, second and third tracking axes is horizontal and wherein said mounting means mounts said radiant energy transmitter to generate a vertical plane of radiant energy.

16. The apparatus of claim 15 wherein said radiant energy transmitter generates a plane of laser energy.

17. The apparatus of claim 13 wherein said means supporting said rotor include a pair of supports spaced along the longitudinal axis of the rotor and each comprising a pair of roller members mounted for rotation on a frame about axes generally parallel to the longitudinal axis of the rotor and spaced laterally apart, said rotor resting on said roller members.

18. The apparatus of claim 17 including motive means to rotate at least one of said pair of roller members in at least one of said supports to rotate said rotor.

19. A method of measuring the runout of a generator rotor having a longitudinal axis, a first cylindrical reference surface near one end, a second cylindrical reference surface near the other end and a series of intermediate rotor sections some of which are successively added to the rotor as it is built up and each having a target surface for which the runout is to be measured, said method comprising steps of:

resting said rotor on spaced apart roller supports;

rotating said rotor on said rollers supports generally about said longitudinal axis;

tracking the first reference surface and measuring the change of position of said first reference surface along a first tracking axis for a plurality of angular positions of said rotor;

tracking the second reference surface and measuring the change of position of said second reference surface along a second tracking axis for said plurality of angular positions of said rotor;

tracking the target surface of a selected intermediate section of the rotor and measuring the change in position of said target surface along a third tracking axis for said plurality of angular positions of the rotor, said first, second and third tracking axes all lying in a common plane and being generally transverse to said longitudinal axis; and determining from the changes in position of the first and second reference surfaces along the first and second tracking axes respectively, and the distance between the first and second tracking axes and the distance between the first and third tracking axes, the change in position of the longitudinal axis along the third tracking axis for each angular position of said rotor and determining for each angular position of the rotor the difference between the change in position of the longitudinal axis and the change in position of the target surface along said third tracking axis.

20. A method of claim 19 including adding intermediate sections to said rotor while said rotor is resting on said rollers and repeating the steps of measuring the change of position of the first and second reference surfaces along the first and second tracking axes respectively as said rotor is rotated through said plurality of angular positions and positioning said third tracking axes to track a target surface on an added intermediate section, measuring the change in position of said target surface on the added intermediate section for each angular position of said rotor, and determining from the changes in position of the first and second reference surfaces along the first and second tracking axes respectively, and the distance between the first and second tracking axes and the distance between the first and third tracking axes for each angular position of the rotor, the change in position of the longitudinal axis along the third tracking axis, and determining the difference between the change in position of the longitudinal axis and the measured change in position of the target surface of the added intermediate section along the third tracking axis.

21. The method of claim 20 wherein the change in position of said longitudinal axis along said third tracking axis is determined in accordance with the following relationship:

$$dev = \Delta_1 + Y\frac{[\Delta_1 - \Delta_2]}{X}$$

where dev equals the change in position of the target surface along the third tracking axis, $\Delta_1$ equals the change in position of the first reference surface measured along the first tracking axis, $\Delta_2$ equals the change in position of the second reference surface measured along the second tracking axis, $\Delta_3$ equals the change in position of the target surface measured along the third tracking axis, X equals the measured distance between the first and second tracking axes and Y equals the measured distance between the first and third tracking axes.

22. The method of claim 20 wherein measuring said changes in position of said reference surfaces and said target surfaces each comprise projecting a plane of laser energy perpendicular to said common plane along the respective tracking axis such that a portion of the plane of laser energy is blocked by said tracked surface and detecting the change in the portion of the plane of laser energy which is blocked by the rotor at each of said plurality of angular positions of said rotor.

23. The method of claim 22 wherein said common plane in which said first, second and third tracking axes all lie is a horizontal plane, and wherein said plane of laser energy is vertical, and including aligning said vertical plane of laser energy using a level.

* * * * *